(12) United States Patent
Monteiro

(10) Patent No.: US 6,480,913 B1
(45) Date of Patent: Nov. 12, 2002

(54) DATA SEQUENCER WITH MUX SELECT INPUT FOR CONVERTING INPUT DATA STREAM AND TO SPECIFIC OUTPUT DATA STREAM USING TWO EXCLUSIVE-OR LOGIC GATES AND COUNTER

(75) Inventor: Anand C. Monteiro, Madison, AL (US)

(73) Assignee: 3Dlabs Inc. Led., Hamilton (BM)

( * ) Notice: Subject to any disclaimer, the term of this patent is extended or adjusted under 35 U.S.C. 154(b) by 0 days.

(21) Appl. No.: 09/353,894

(22) Filed: Jul. 15, 1999

Related U.S. Application Data
(60) Provisional application No. 60/093,196, filed on Jul. 17, 1998.

(51) Int. Cl.[7] ............................ G06F 7/00; G06F 12/02; G06F 9/00
(52) U.S. Cl. ............................ 710/65; 710/33; 710/51; 712/32; 712/226; 712/300; 717/8; 717/219
(58) Field of Search .............................. 710/53, 51, 65; 712/32, 300, 226; 717/8, 217

(56) References Cited

U.S. PATENT DOCUMENTS

| | | | |
|---|---|---|---|
| 4,434,437 A | 2/1984 | Strolle et al. ............... | 348/442 |
| 4,615,013 A | 9/1986 | Yan et al. ................... | 345/582 |
| 4,646,232 A | 2/1987 | Chang et al. ............... | 710/113 |
| 4,908,780 A | 3/1990 | Priem et al. ................ | 345/611 |
| 4,918,626 A | 4/1990 | Watkins et al. ............. | 345/421 |
| 4,991,122 A | 2/1991 | Sanders ...................... | 345/698 |
| 5,107,415 A * | 4/1992 | Sato et al. .................. | 712/300 |
| 5,123,085 A | 6/1992 | Wells et al. ................ | 345/421 |
| 5,200,749 A * | 4/1993 | Crosby et al. ................ | 341/87 |
| 5,239,654 A | 8/1993 | Ing-Simmons et al. ....... | 712/20 |
| 5,287,438 A | 2/1994 | Kelleher ..................... | 345/613 |
| 5,293,480 A | 3/1994 | Miller et al. ................ | 345/502 |
| 5,313,551 A | 5/1994 | Labrousse et al. .......... | 711/149 |
| 5,319,759 A * | 6/1994 | Chan .......................... | 711/217 |
| 5,363,475 A | 11/1994 | Baker et al. ................ | 345/422 |

(List continued on next page.)

FOREIGN PATENT DOCUMENTS

| | | | |
|---|---|---|---|
| EP | 0311798 | * | 4/1989 |
| EP | 0 397 180 A2 | | 11/1990 |
| EP | 0 438 194 A2 | | 7/1991 |
| EP | 0 448 286 A2 | | 9/1991 |
| EP | 0 463 700 A2 | | 1/1992 |

(List continued on next page.)

OTHER PUBLICATIONS

IBM Technical Disclosure Bulletin, vol. 33, No. 1A, Jun. 1, 1990, pp. 420–427.*
"A Fine Grained Data Flow Machine and Its Concurrent Execution Mechanism," Iwashita et al., C&C Information Technology Research Lags, Apr. 1989, pp. 63–72.

(List continued on next page.)

*Primary Examiner*—Thomas Lee
*Assistant Examiner*—Tammara Peyton
(74) *Attorney, Agent, or Firm*—Bockhop & Reich, LLP

(57) ABSTRACT

A system converts an input data stream in a first format (identified by a first stream code having at least two bits) into an output data stream in a second format. The system includes, among other things, a data sequencer for sequencing the input data stream and a counter. The sequencer includes a select input having a first number of selection input locations, a data input for receiving the digital data stream, and output for transmitting the output data stream. The counter includes the first number of selection outputs. A first logic element and a second logic element are coupled to a number of the selection inputs of the sequencer and a number of the selection outputs of the counter. The first and second logic elements control the data sequencer such that the input data stream in converted into the second format.

21 Claims, 3 Drawing Sheets

U.S. PATENT DOCUMENTS

| | | | |
|---|---|---|---|
| 5,371,840 A | | 12/1994 | Fischer et al. ............... 345/419 |
| 5,394,524 A | | 2/1995 | DiNicola et al. ............ 345/506 |
| 5,398,328 A | * | 3/1995 | Weber et al. .................... 717/8 |
| 5,446,479 A | | 8/1995 | Thompson et al. ............. 345/6 |
| 5,485,559 A | | 1/1996 | Sakaibara et al. ........... 345/505 |
| 5,511,165 A | | 4/1996 | Brady et al. ................. 709/216 |
| 5,519,823 A | | 5/1996 | Barkans ....................... 345/443 |
| 5,544,294 A | | 8/1996 | Cho et al. .................... 345/441 |
| 5,555,359 A | | 9/1996 | Choi et al. ................... 345/441 |
| 5,557,734 A | | 9/1996 | Wilson ........................ 345/505 |
| 5,561,749 A | | 10/1996 | Schroeder ................... 345/420 |
| 5,572,713 A | | 11/1996 | Weber et al. ............... 703/127 |
| 5,572,813 A | * | 11/1996 | Mastuoka ..................... 703/27 |
| 5,631,693 A | | 5/1997 | Wunderlich et al. .......... 725/91 |
| 5,664,114 A | | 9/1997 | Krech, Jr. et al. .......... 709/234 |
| 5,666,520 A | | 9/1997 | Fujita et al. ................. 345/559 |
| 5,684,939 A | | 11/1997 | Foran et al. ................. 345/612 |
| 5,701,365 A | | 12/1997 | Harrington et al. ......... 382/212 |
| 5,706,481 A | | 1/1998 | Hannah et al. ............. 345/519 |
| 5,721,812 A | * | 2/1998 | Mochizuki ................. 358/1.11 |
| 5,737,455 A | | 4/1998 | Harrington et al. ......... 382/284 |
| 5,757,375 A | | 5/1998 | Kawase ....................... 345/613 |
| 5,757,385 A | | 5/1998 | Narayanaswami et al. .. 345/505 |
| 5,764,237 A | | 6/1998 | Kaneko ....................... 345/552 |
| 5,821,950 A | | 10/1998 | Rentschler et al. ......... 345/505 |
| 5,841,444 A | | 11/1998 | Mun et al. ................... 345/506 |
| 5,870,567 A | | 2/1999 | Hausauer et al. ........... 710/310 |
| 5,883,641 A | | 3/1999 | Krech, Jr. et al. .......... 345/505 |
| 5,914,711 A | | 6/1999 | Mangerson et al. ........ 345/547 |
| 6,212,628 B1 | * | 4/2001 | Abercrombie et al. ...... 712/226 |

FOREIGN PATENT DOCUMENTS

| | | |
|---|---|---|
| EP | 0 566 299 A2 | 10/1993 |
| EP | 0 627 682 A1 | 12/1994 |
| EP | 0 631 252 A2 | 12/1994 |
| EP | 0 693 737 A2 | 1/1996 |
| EP | 0 734 008 A1 | 9/1996 |
| EP | 0 735 463 A2 | 10/1996 |
| EP | 0 810 553 A2 | 12/1997 |
| EP | 0 817 009 A2 | 1/1998 |
| EP | 0 825 550 A2 | 2/1998 |
| EP | 0 840 279 A2 | 5/1998 |
| WO | WO 86/07646 | 12/1986 |
| WO | WO 92/00570 | 1/1992 |
| WO | WO 93/06553 | 4/1993 |
| WO | WO 97/21192 | 6/1997 |

OTHER PUBLICATIONS

"A Dataflow Image Processing System TIP–4," Fujita et al., C&C Information Technology Research Labs, NEC Corporation, Sep. 1989, pp. 735–741.

"Processing the New World of Interactive Media," Rathnam, The Trimedia VLIW CPU Architecture, Mar. 1998, pp. 108–117.

"Effective Cache Mechanism for Texture Mapping," IBM Technical Disclosure Bulletin, vol. 39, No. 12, Dec. 1996, pp. 213–217.

"Advanced Raster Graphics Architecture," XP–002118066, pp. 890–893.

"One Frame Ahead: Frame Buffer Management for Animation and Real–Time Graphics," XP–000749898, Auel et al., Tektronix Inc., pp. 43–50.

"Efficient Alias–Free Rendering Using Bit–Masks and Look–Up Tables," Abram et al., The University of North Carolina at Chapel Hill, XP–002115680, Jul. 1985, pp. 53–59.

"A New Simple and Efficient Antialiasing with Subpixel Masks," Schilling et al., Computer Graphics, vol. 25, No. 4, Jul. 1991, pp. 133–141.

"A Multiprocessor System Utilizing Enhanced DSP's for Image Progressing," Ueda et al., XP 2028756, pp. 611–619.

"The Reyes Image Rendering Architecture," Cook et al., Computer Graphics, vol. 21, No. 4, Jul. 1987, pp. 95–102.

"The Accumulation Buffer: Hardware Support for High–Quality Rendering," Haeberli et al., Computer Graphics, vol. 24, No. 4, Aug. 1990, pp. 309–318.

"Advanced Animation and Rendering Techniques," Watt et al., ACM Press, New York, New York, pp. 127–137.

The A–Buffer, an Antialiased Hidden Surface Method, Carpenter, Loren, Computer Graphics, vol. 18, No. 3, Jul 1984, pp. 13–18.

* cited by examiner

DATA SEQUENCER WITH MUX SELECT INPUT FOR CONVERTING INPUT DATA STREAM AND TO SPECIFIC OUTPUT DATA STREAM USING TWO EXCLUSIVE-OR LOGIC GATES AND COUNTER

This application claims priority from U.S. provisional patent application Ser. No. 60/093,196, filed Jul. 17, 1998, entitled "DATA SEQUENCING APPARATUS AND METHOD", the disclosure of which is incorporated herein, in its entirety, by reference.

FIELD OF THE INVENTION

This invention generally relates to computer systems and more particularly, to data sequencing within computer systems.

BACKGROUND OF THE INVENTION

Data in a computer system may be organized in different formats. Three methods commonly used are little endian, big endian, and bitmap formats. Little and big endian formats vary the significance of bytes in multibyte words. In big endian systems, for example, the leftmost bytes are most significant. In little endian systems, however, the rightmost bytes are most significant. Computer systems can be configured to handle either or both types of endian data formats.

A graphical image may be represented in computer memory by the well known bitmap format. More particularly, in systems that utilize bitmap formats, data streams of ones and zeros may be produced by means of a simple sequencer. The ones and zeros in the stream may represent the state of pixels, for example, on a computer monitor. A "1" value, for example, may represent a lit pixel, while a "0" value may represent an unlit pixel. The combination of lit and unlit pixels produce a text character on a computer monitor.

Systems utilizing either or both the big and little endian formats, however, require special handling to reorder the data into a format that is understandable to a downstream device such as, for example, a computer monitor or a printer. FIG. 1 shows a prior art system for sequencing received 32-bit data or words (from a microprocessor, for example) into a readable format for the downstream device. Each 32-bit word (input word 10) received by the system has four bytes; namely B0, B1, B2, and B3. In this system, four possible types of word formats (represented by word codes "00", "01", "10" and "11") may be converted into a readable bit stream 17. Specifically, the four disclosed bytes (B0, B1, B2, and B3) are positioned at different locations within each word defined by each of the four word formats. Upon receipt of one of the four word formats, the system of FIG. 1 first reorders the bytes to the order defined by the word format identified by the word code "00" (i.e., little endian format). This reordering is performed by passing the four bytes through a 32-bit wide 4-to-1 multiplexer 11. The 4-to-1 multiplexer 11 has four one-byte wide inputs for receiving each of the four bytes of the input word 10. The multiplexer has a two-bit select input 15 for receiving the word code. The 4-to-1 multiplexer 11 is configured to reorder the received word based upon the word code received by the select input 15. For example, for the word code "00" (i.e., little endian format), the bytes of the input word 10 will be reordered to B0, B1, B2, B3.

After the input word 10 is reordered, the system utilizes a sequencer 18 to produce a bit stream 17 that has the bits arranged in a preselected order for use by the downstream hardware device. To that end, the sequencer 18 includes a 5-bit counter 12 and a 32-to-1 multiplexer 13. In the embodiment shown, the counter 12 counts from 0 to 31 which, when such data is received by the 32-to-1 multiplexer 13, causes the 32-to-1 multiplexer 13 to read first from the first multiplexer input line (i.e., the least significant bit), then the second multiplexer input line, etc. until the final (thirty-second) multiplexer input line (i.e., the most significant bit) is read. A drawback to the sequencer 18 shown in FIG. 1, however, is the large amount of circuit area and delay time taken up by the 32-bit 4-to-1 multiplexer 11.

SUMMARY OF THE INVENTION

In accordance with one aspect of the invention, a system converts an input data stream in a first format (identified by a first stream code having at least two bits) into an output data stream in a second format. To that end, the system includes, among other things, a data sequencer for sequencing the input data stream. The sequencer includes a select input having a first number of selection input locations, a data input for receiving the input data stream, and output for transmitting the output data stream. The system further includes a counter having the first number of selection outputs, and first and second logic elements that are each connected to different selection input locations of the data sequencer. More particularly, the first logic element has an output coupled to a first of the selection input locations, and a two-bit input for receiving at least two bits. One bit input of the two-bit input receives a first bit of the stream code, while a second bit input of the two-bit input is coupled to one of the selection outputs of the counter. In a similar manner, the second logic element has an output coupled to a second of the selection input locations, and a two-bit input for receiving at least two bits. One bit input of the two-bit input receives a second bit of the stream code, while a second bit input of the two-bit input is coupled to a second of the selection outputs of the counter. In preferred embodiments, the first and second logic elements control the data sequencer to convert the input data stream into the output data stream in the second format.

In preferred embodiments, the first data stream is received from a first computer element such as, for example, a computer microprocessor, while the second data stream is directed to another computer element such as, for example, a computer monitor or a printer. Moreover, the logic elements preferably are exclusive-or ("XOR") gates, or other devices producing equivalent output. In some embodiments, the first and second data formats are endian formats.

In other aspects of the invention, the second bit input of the first logic element is coupled to a first selection output of the counter, and the second bit input of the second logic element is coupled to a second selection output of the counter. In preferred embodiments, the first selection output outputs a more significant bit than that outputted by the second selection output. In other embodiments, the counter counts consecutively ascending numbers between zero and thirty-one. In a preferred embodiment, the counter is a modulo counter. In yet another embodiment, the system further includes a third logic element which has as output coupled to a third of the selection input locations, and a two-bit input for receiving at least two bits. One bit input of the two-bit input receives a third bit of the stream code, while a second bit input of the two-bit input is coupled to one of the selection outputs of the counter.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF PREFERRED EMBODIMENTS

Figure 2:
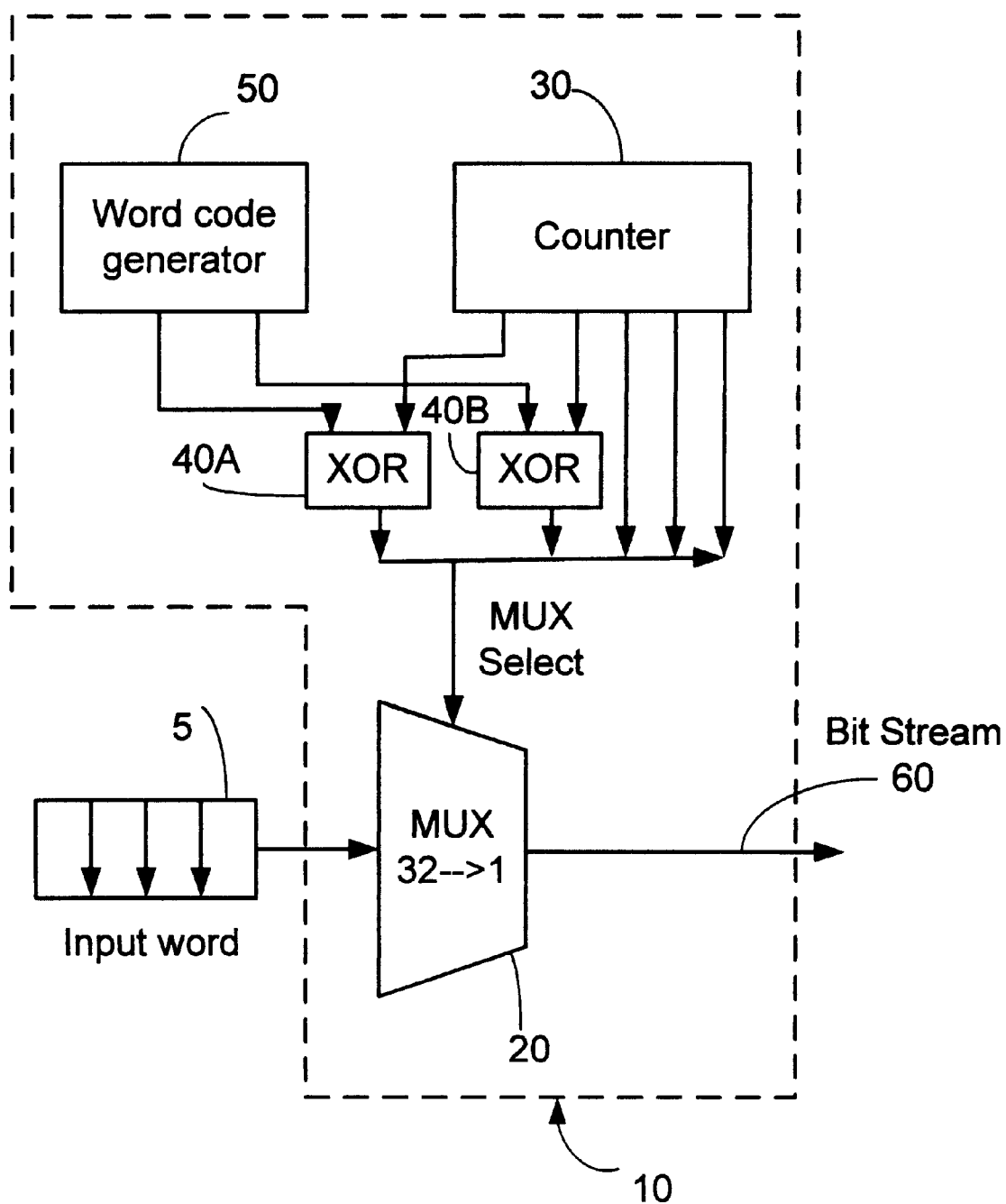
FIG. 2 schematically shows a preferred embodiment of a system for converting data into a preselected bit stream.

FIG. 2 shows a preferred embodiment of a data converter system 10 for use in a computer system having 32-bit wide data transmission capabilities. In preferred embodiments, the data converter system 10 receives a data stream in a known format from a microprocessor, and converts the data into a bit stream having a format that is understandable to another part of the computer system. For example, the bit stream may be converted for use by a video display monitor or a printer (neither of which is shown). The data converter system 10 preferably is implemented upon a graphics accelerator card within the computer system. For additional information relating to a preferred graphics accelerator card, see copending U.S. patent application Ser. No. 09/353,495 entitled, "Multi-Processor Graphics Accelerator", naming Steven J. Heinrich, Mark A. Mosley, Clifford A. Whitmore, James L. Deming, Stewart G. Carlton, Matt E. Buckelew, and Dale L. Kirkland as inventors, and filed on even date herewith, the disclosure of which is incorporated by reference in its entirety.

Figure 1:
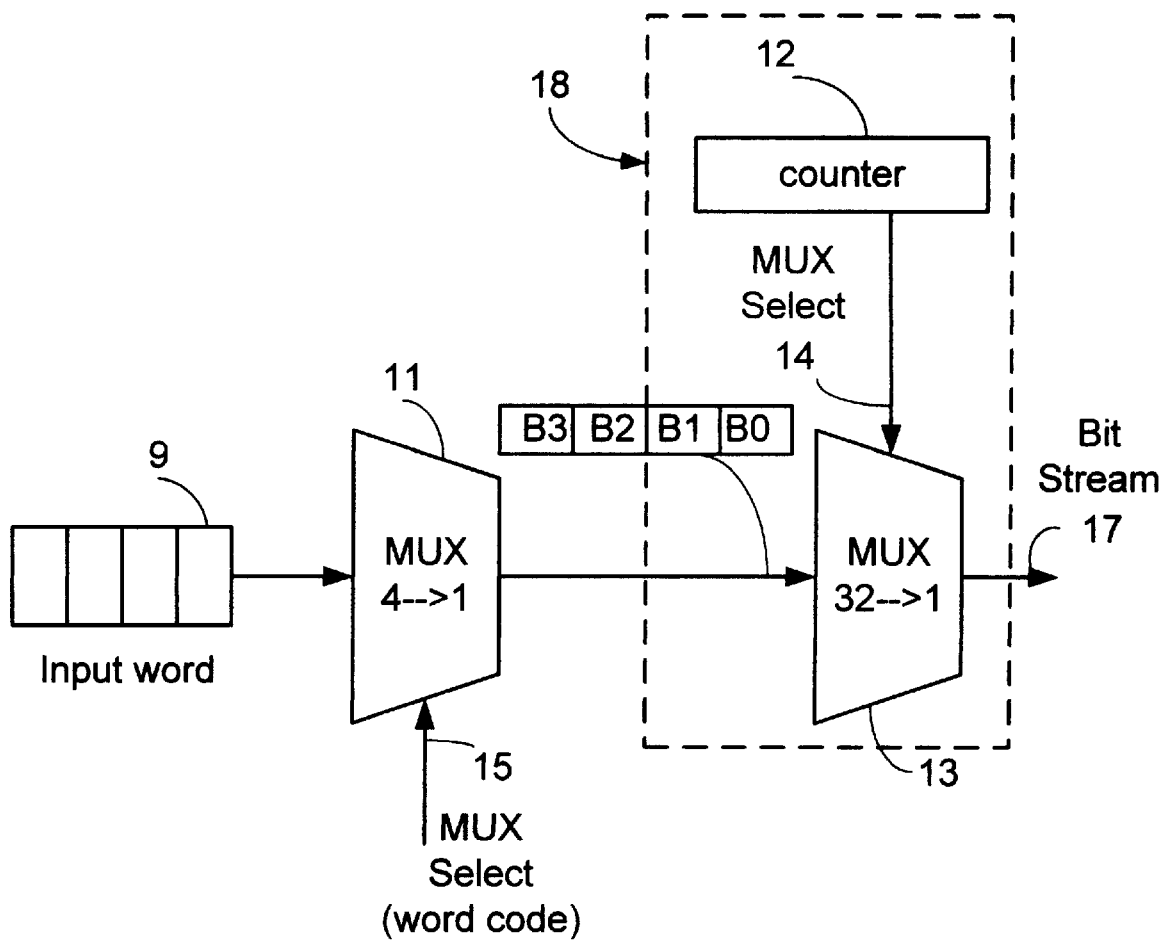
FIG. 1 schematically shows a prior art system for converting input data into a preselected bit stream.

In accordance with preferred embodiments, the data converter system 10 eliminates the need for the 32-bit 4-to-1 multiplexer used in the prior art system shown in FIG. 1. Instead (as discussed below), two exclusive-or gates ("XOR" gates 40A and 40B) and a word code generator 50 are used in conjunction with a counter 30 to control a 32-to-1 multiplexer 20 to sequence the input data stream into an output bit stream having a preselected bit order.

In preferred embodiments, the input data stream is in either one of the well known big endian or little endian word formats. The input data stream preferably includes a plurality of four-byte words that each include bytes B0, B1, B2, and B3. Within each byte, eight bits are arranged in a format from the least significant bit to the most significant bit. In preferred embodiments, each byte may be in one of four locations within the ordered word 5. Specifically, the bytes are arranged so that byte B0 includes bits 0–7, byte B1 includes bits 8–15, byte B2 includes bits 16–23, and byte B3 includes bits 24–31. Bits 0–7 are the least significant bits of the word, while bits 24–31 are the most significant bits of the word. As shown below, although the location of each byte within a word is varied, each byte retains its original bits and their assigned values as if the bytes are arranged consecutively from B0 to B3. Each four-byte word is referred to herein as an "ordered word 5."

As shown in table 1 below, the bytes in each ordered word 5 may be arranged in one of four word formats. Each word format is identified by two bit word codes "00","01", "10" and "11." Other word formats also may be utilized in accordance with preferred embodiments of the invention. Table 1 shows the order of the bytes B0–B3 for each type of word format.

TABLE 1

| Word Code | Byte order | Bit order |
|---|---|---|
| 00 | B0, B1, B2, B3 | 0–31; |
| 01 | B1, B0, B3, B2 | 8–15; 0–7; 24–31; 16–23; |
| 10 | B2, B3, B0, B1 | 16–23; 24–31; 0–7; 8–15; |
| 11 | B3; B2, B1, B0 | 24–31; 16–23; 8–15; 0–7; |

Each ordered word 5 is passed through the data converter system 10 to produce a resultant bit stream 60 in response to receipt of the two bit word code which corresponds to the word format of the input ordered word 5. In order to produce the correct bit order for the resultant bit stream 60, the count of counter 30 is modified using the XOR gates 40A and 40B. In preferred embodiments, the data converter system 10 is preconfigured to order the resultant bit stream 60 in an order that arranges the bits in ascending order from the least significant bit of byte B0 to the most significant bit of byte B3. In alternative embodiments, the XOR gates 40A and 40B may be moved to other locations on the counter 30 so that other bit orders may be produced for the resultant bit stream 60.

The counter 30 preferably includes five individual outputs that each correspond to one counting bit. In preferred embodiments, the counter 30 counts from zero to thirty-one via the five individual outputs. In a preferred embodiment, counter 30 is a modulo counter. The outputs of counter 30 range from a least significant bit output to a most significant bit output. Preferably, two outputs of counter 30 are coupled to the respective inputs of the first XOR gate 40A and the second XOR gate 40B. In preferred embodiments, the most significant bit output of the counter 30 is coupled to a first input of the first XOR gate 40A, while the second most significant bit output of the counter 30 is coupled to a first input of the second XOR gate 40B. The first and second XOR gates 40A and 40B also preferably include respective second inputs that each are coupled to the output of the (two-bit) word code generator 50. More particularly, the second input of the first XOR gate 40A is coupled to a most significant bit of the word code generator 50, while the second input of the second XOR gate 40B is coupled to a least significant bit of the word code generator 50. The word code generator 50 produces the two bit code that identifies the word format of the input ordered word 5.

As shown in FIG. 2, the first and second XOR gates 40A and 40B also have respective outputs that are coupled with two of five select inputs of the multiplexer 20. In preferred embodiments, the two select inputs of the multiplexer coupled to the outputs of the first and second XOR gates 40A and 40B are for receipt of the most significant bits of a select signal for the multiplexer 20. The remaining three less significant bit select inputs of the multiplexer 20 correspondingly are coupled with the three least significant bit outputs of the counter 30.

In order to produce a bit stream 60 that is ordered from bit 0 to bit 31 (byte B0 to byte B3), the two most significant bits of the counter 30 are modified by the two XOR gates 40A and 40B. For example, when a word format identified by the word code "11" is utilized, the XOR gates 40A and 40B modify the two most significant bits of the counter 30 using the word code "11." The modified count of counter 30 that results is shown below in table 2.

As shown above in table 1, the order of bytes B0-B3 of ordered word 5 for the word format identified by the word code "11" would be B3, B2, B1, B0 (bit order 24–31;

16–23;8–15;0–7). When the modified count of counter 30 is received by the multiplexer 20, the multiplexer 20 is controlled to read first from the twenty-fourth multiplexer input line (i.e., the location of the least significant bit, bit zero, in byte B0) then the twenty-fifth multiplexer input line, etc. until the seventh multiplexer input line (i.e., the location of the most significant bit, bit thirty-one, in byte B3) is read.

TABLE 2

| 5-bit Count | Word Code | Modified Count | Byte | Bit |
|---|---|---|---|---|
| 00000 | 11 | 11000 = 24 | B0 | 0 |
| 00001 | 11 | 11001 = 25 | B0 | 1 |
| . | . | . | . | . |
| . | . | . | . | . |
| . | . | . | . | . |
| 01000 | 11 | 10000 = 16 | B1 | 8 |
| 01001 | 11 | 10001 = 17 | B1 | 9 |
| . | . | . | . | . |
| . | . | . | . | . |
| . | . | . | . | . |
| 10000 | 11 | 01000 = 8 | B2 | 16 |
| 10001 | 11 | 01001 = 9 | B2 | 17 |
| . | . | . | . | . |
| . | . | . | . | . |
| . | . | . | . | . |
| 11000 | 11 | 00000 = 0 | B3 | 24 |
| 11001 | 11 | 00001 = 1 | B3 | 25 |
| . | . | . | . | . |
| . | . | . | . | . |
| . | . | . | . | . |

Accordingly, the system 10 produces a bit stream 60 for word code "11" in the bit sequence from bit zero to bit thirty-one (i.e., B0, B1, B3, B3). The XOR gates 40A and 40B utilized in the data converter system 10 have circuit area and time delay savings over the 32 bit 4-to-1 multiplexer shown in the prior art system of FIG. 1 and thus, provide better results.

In some embodiments, the input ordered words 5 each represent characters for display on a display device. Each ordered word 5 thus includes various data relating to one character. A high bit in the bit stream 60 (i.e., a bit set to "1") may represent a lit pixel, while a low bit in the bit stream 60 (i.e., a bit set to "0") may represent an unlit pixel. Among other things, the output stream 60 also may represent background and/or foreground data for one character. The data converter system 10 thus receives the input information 5 and rearranges the bits in an order that may be used by the display device.

Figure 3:
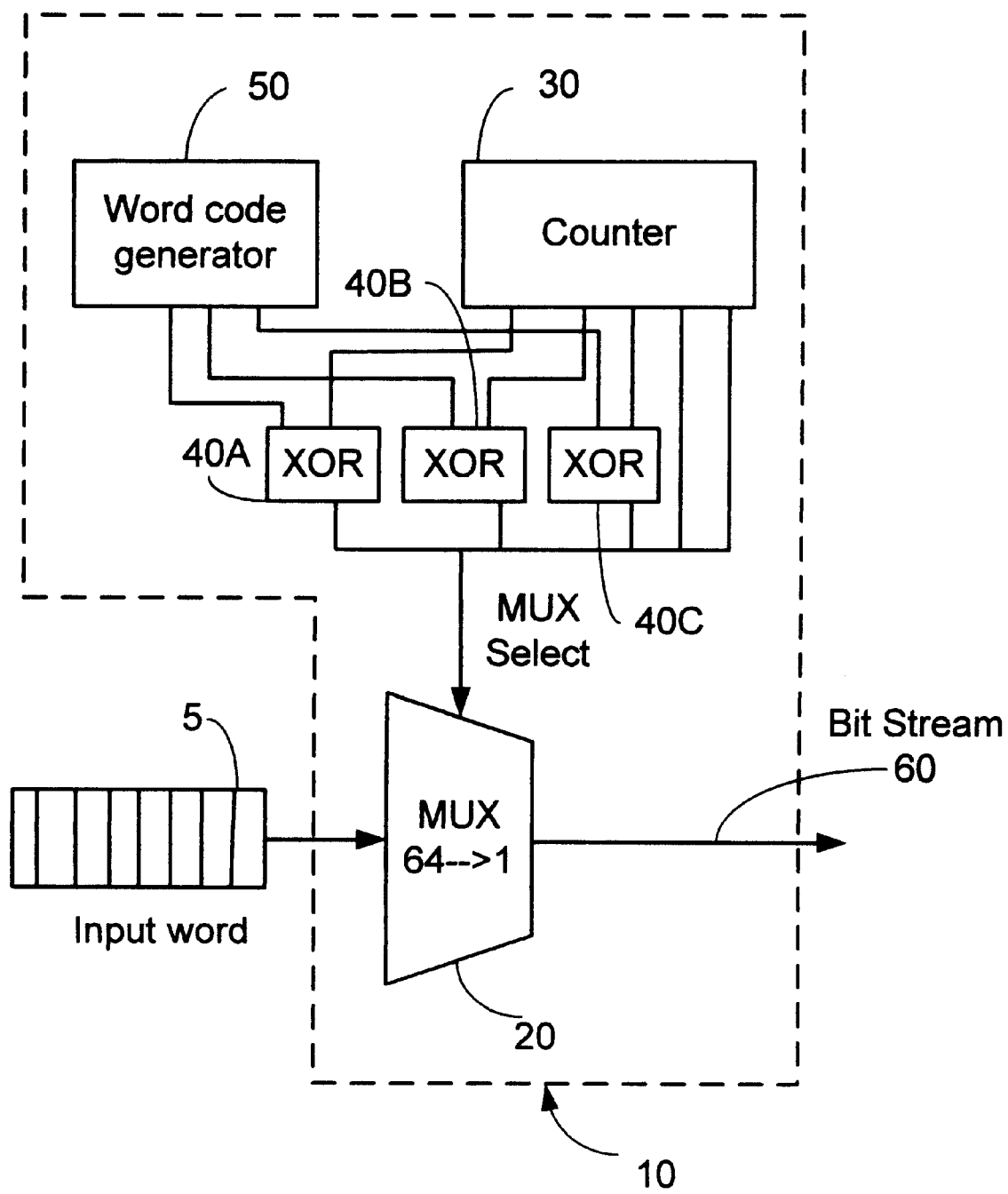
FIG. 3 schematically shows an alternative embodiment of a system for converting data into a preselected bit stream.

FIG. 3 shows an alternative embodiment of the system for use in a computer system that utilizes 64-bit words. Each 64-bit word contains 8 bytes, B0 to B7. A 6-bit counter 30 is used instead of a 5-bit counter in order to produce an ascending count from 0 to 64. A 64-to-1 multiplexer 20 receives the count signal as its select input. The word code produced by the word code generator 50 in this embodiment includes three bits instead of two bits. A third XOR gate 40C preferably is connected as shown in FIG. 3 to compare the third most significant bit of the count of counter 30 and the least significant bit of the word code generator 50. The three XOR gates 40A–40C modify the count of counter 30 with the word code produced by word code generator 50 in a manner similar to that described above with regard to FIG. 2.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

I claim:

1. A system for converting an input data stream in a first format into an output data stream in a second format, the input data stream being identified by a first stream code having at least two bits, the system comprising:
  a data sequencer for sequencing the input data stream, the sequencer comprising:
    a select input having a first number of selection input locations;
    a data input for receiving the input data stream; and
    an output for transmitting the output data stream;
  a counter having the first number of selection outputs;
  a first logic element having an output coupled to a first of the selection input locations of the data sequencer, the first logic element further including a two-bit input for receiving at least two bits, one bit input of the two-bit input receiving a first bit of the stream code, a second bit input of the two-bit input being coupled to one of the selection outputs of the counter;
  a second logic element having an output coupled to a second of the selection input locations of the data sequencer, the second logic element further including a two-bit input for receiving at least two bits, one bit input of the two-bit input receiving a second bit of the stream code, a second bit input of the two-bit input being coupled to a second of the selection outputs of the counter,
  the first and second logic elements controlling the data sequencer such that the input data stream is converted into the output data stream in the second format.

2. The system as defined by claim 1 wherein the first and second logic elements are exclusive-or gates.

3. The system as defined by claim 1 wherein the second bit input of the first logic element is coupled to a first selection output of the counter, the second bit input of the second logic element being coupled to a second selection output of the counter, further wherein the first selection output outputs a more significant bit than that outputted by the second selection output.

4. The system as defined by claim 1 wherein the first format is an endian format.

5. The system as defined by claim 1 wherein the counter counts consecutively ascending numbers between zero and thirty-one.

6. The system as defined by claim 1, further including:
  a third logic element having an output coupled to a third of the selection input locations of the data sequencer, the third logic element further including a two-bit input for receiving at least two bits, one bit input of the two-bit input receiving a third bit of the stream code, a second bit input of the two-bit input being coupled to a third of the selection outputs of the counter;
  wherein the first, second and third logic elements control the data sequencer such that the input data stream is converted into the output data stream in the second format.

7. The system as defined by claim 6, wherein the first, second and third logic elements are exclusive-or gates.

8. A system for converting an input data stream having a first order into an output data stream having a second order, the first order being identified by two identifier bits, the system comprising:
  a counter having at least two most significant bit outputs;
  a data sequencer for sequencing the input data stream into the second order, the sequencer comprising:

a count input that receives data from the counter;

a data input for receiving the input data stream; and an output for transmitting the output data stream;

a first exclusive-or logic element for applying an exclusive-or operation to a first of the two most significant bit outputs of the counter and a first of the two identifier bits identifying the first order, the exclusive-or operation producing a first value that is directed to the count input of the data sequencer; and a second exclusive-or logic element for applying an exclusive-or operation to a second of the two significant bit outputs of the counter and a second of the two identifier bits identifying the first order, the exclusive-or operation producing a second value that is directed to the count input of the data sequencer.

9. The system as defined by claim 8 wherein the data input includes a preselected number of bit inputs, the counter sequentially counting the preselected number.

10. The system as defined by claim 8 wherein the data sequencer is a multiplexer.

11. The system as defined by claim 8 wherein the counter includes a plurality of least significant bit outputs that are directly coupled with the count input of the data sequencer.

12. The system as defined by claim 8 wherein the first exclusive-or logic element includes a first output that is coupled with the count input of the data sequencer.

13. The system as defined by claim 12 wherein the second exclusive-or logic element includes a second output that is coupled to the count input of the data sequencer.

14. The system as defined by claim 8 wherein the first order is identified by three identifier bits, and wherein the counter includes a third most significant bit output, the system further comprising:

a third exclusive-or logic element for applying an exclusive-or operation to the third of the most significant bit outputs of the counter and a third of the two identifier bits identifying the first order, the exclusive-or operation producing a third value that is directed to the count input of the data sequencer.

15. The system as defined by claim 14 wherein the data sequencer is a multiplexer.

16. The system as defined by claim 8 wherein receipt of the first value and second value by the data sequencer controls the data sequencer to produce the output data stream in the second order.

17. The system as defined by claim 14, wherein receipt of the first value, the second value and the third value by the data sequencer controls the data sequencer to produce the output data stream in the second order.

18. An apparatus for converting an input data stream having an input format into a output data stream having an output format, the input form being identified by a stream identifier, the apparatus comprising:

a data stream input for receiving the input data stream;

a select input for entering a select signal;

a counter having a first and second plurality of count outputs;

a stream identifier generator that generates the stream identifier which identifies the input format of the input data stream;

a first logic gate having a respective input coupled with both the stream identifier generator and at least one of the first respective count outputs, the first logic gate also having an output coupled with the select input;

a second logic gate having a respective input coupled with both the stream identifier generator and at least one of the first respective count outputs, the second logic gate also having an output coupled with the select input;

the second plurality of count outputs coupled to the select input; and a data stream output for forwarding the output data stream in the output format.

19. The apparatus as defined by claim 18, wherein the logic gates are exclusive-or gates.

20. The apparatus as defined by claim 18, wherein the counter is a modulo counter.

21. The apparatus as defined by claim 18, wherein the data stream input, select input and data stream output are part of a multiplexer.

* * * * *